US010223958B2

(12) United States Patent
Lee et al.

(10) Patent No.: US 10,223,958 B2
(45) Date of Patent: *Mar. 5, 2019

(54) DISPLAY DEVICE AND DRIVING METHOD THEREOF

(71) Applicant: SAMSUNG DISPLAY CO., LTD., Yongin (KR)

(72) Inventors: Jun-Pyo Lee, Cheonan-si (KR); Sun-Kyu Son, Suwon-si (KR); Ok-Kwon Shin, Cheonan-si (KR); Jung-Won Kim, Seoul (KR); Hee-Jin Choi, Seoul (KR); Sang-Soo Kim, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 347 days.

This patent is subject to a terminal disclaimer.

(21) Appl. No.: 14/880,890

(22) Filed: Oct. 12, 2015

(65) Prior Publication Data

US 2016/0035271 A1 Feb. 4, 2016

Related U.S. Application Data

(63) Continuation of application No. 12/243,547, filed on Oct. 1, 2008, now Pat. No. 9,158,168.

(30) Foreign Application Priority Data

Aug. 11, 2008 (KR) ........................ 10-2008-0078252

(51) Int. Cl.
*G09G 3/20* (2006.01)
*G02F 1/1362* (2006.01)
(Continued)

(52) U.S. Cl.
CPC ....... *G09G 3/2096* (2013.01); *G02F 1/13624* (2013.01); *G09G 3/3659* (2013.01);
(Continued)

(58) Field of Classification Search
CPC ............... G09G 3/2096; G09G 3/3659; G09G 2020/0257; G09G 2300/0426;
(Continued)

(56) References Cited

U.S. PATENT DOCUMENTS 6,940,573 B2 * 9/2005 Um .................... G02F 1/133371
349/129
7,944,515 B2 5/2011 Song
(Continued)

FOREIGN PATENT DOCUMENTS

CN 1343904 4/2002
JP 10253987 A 9/1998
(Continued)

*Primary Examiner* — Jonathan R Horner
(74) *Attorney, Agent, or Firm* — Cantor Colburn LLP

(57) ABSTRACT

A display device includes a first unit pixel disposed in a first pixel column and a first pixel row, and a second unit pixel disposed in the first pixel column and a second pixel row adjacent to the first pixel row, and first and second gate lines extending in a row direction and having gate voltage input pads at a terminal portion thereof. First and second data lines extend in a column direction and are connected to the first unit pixel and the second unit pixel, respectively. A first charge control line extends in the row direction and has a charge control gate voltage input pad disposed at a terminal portion thereof. The first gate line is connected to the first unit pixel and the second gate line is connected to the second unit pixel. The first gate line and the second gate line simultaneously receive a same gate pulse.

16 Claims, 10 Drawing Sheets

(51) Int. Cl.
  *G09G 3/36* (2006.01)
  *G02F 1/1343* (2006.01)
(52) U.S. Cl.
  CPC ............ *G02F 1/136286* (2013.01); *G02F 2001/134345* (2013.01); *G02F 2001/134354* (2013.01); *G09G 2300/0426* (2013.01); *G09G 2300/0852* (2013.01); *G09G 2310/0205* (2013.01); *G09G 2320/0257* (2013.01)
(58) Field of Classification Search
  CPC .... G09G 2300/0852; G09G 2310/0205; G02F 1/13624; G02F 1/136286; G02F 2001/134345; G02F 2001/134354
  See application file for complete search history.

(56) References Cited

U.S. PATENT DOCUMENTS

| | | | | |
|---|---|---|---|---|
| 9,158,168 | B2* | 10/2015 | Lee | G02F 1/13624 |
| 9,529,237 | B2* | 12/2016 | Kim | G02F 1/136286 |
| 2002/0033907 | A1* | 3/2002 | Oke | G02F 1/136286 |
| | | | | 349/46 |
| 2003/0218586 | A1* | 11/2003 | Wu | G09G 3/3648 |
| | | | | 345/87 |
| 2004/0008172 | A1* | 1/2004 | Nakamura | G06F 3/0412 |
| | | | | 345/89 |
| 2005/0122441 | A1 | 6/2005 | Shimoshikiryoh | |
| 2006/0284811 | A1 | 12/2006 | Huang | |
| 2007/0064164 | A1* | 3/2007 | Tasaka | H01L 27/1255 |
| | | | | 349/38 |
| 2008/0062107 | A1* | 3/2008 | Su | G09G 3/3607 |
| | | | | 345/92 |
| 2008/0123002 | A1 | 5/2008 | Yeh | |
| 2008/0136983 | A1* | 6/2008 | Huang | G09G 3/3659 |
| | | | | 349/38 |
| 2008/0251797 | A1* | 10/2008 | Chang | G02F 1/136213 |
| | | | | 257/88 |
| 2009/0027325 | A1 | 1/2009 | Kim et al. | |
| 2013/0250198 | A1 | 9/2013 | Shimoshikiryoh et al. | |

FOREIGN PATENT DOCUMENTS

| | | |
|---|---|---|
| JP | 2006133577 A | 5/2006 |
| JP | 2007108755 A | 4/2007 |
| KR | 100637529 B1 | 10/2006 |

* cited by examiner and pixel rows, the plurality of unit pixels comprising a first unit pixel disposed in a first pixel column and a first pixel row, and a second unit pixel disposed in the first pixel column and a second pixel row adjacent to the first pixel row. The display device further includes a first gate line and a second gate line extending in a substantially row direction and each having a gate voltage input pad disposed at a terminal portion thereof; a first data line and a second data line extending in a substantially column direction and connected to the first unit pixel and the second unit pixel, respectively; and a first charge control line extending in substantially the row direction and having a charge control gate voltage input pad disposed at a terminal portion thereof. The first gate line is connected to the first unit pixel and the

DISPLAY DEVICE AND DRIVING METHOD THEREOF

This application is a continuation of U.S. patent application Ser. No. 12/243,547, filed on Oct. 1, 2008, which claims priority to Korean Patent Application No. 10-2008-0078252, filed on Aug. 11, 2008, and all the benefits accruing therefrom under 35 U.S.C. § 119, the contents of which in its entirety are herein incorporated by reference.

BACKGROUND OF THE INVENTION

1. Field of the Invention

The present invention relates to a display apparatus. More particularly, the present invention relates to a display apparatus having reduced afterimages and improved display quality, and a method of driving the same.

2. Description of the Related Art

Liquid crystal display ("LCD") devices are being actively developed to improve advantages such as small size, light weight and large screen size relative to other types of display devices, such as cathode ray tubes ("CRTs"), for example. In general, the LCD displays an image using a plurality of unit pixels, each unit pixel thereof including a thin film transistor ("TFT") and a liquid crystal capacitor.

More specifically, the liquid crystal capacitor typically includes a pixel electrode, a common electrode and a liquid crystal layer disposed therebetween. In operation of the LCD, an electric field is developed between the pixel electrode and the common electrode by supplying external charges, e.g., a gradation signal, to the pixel electrode though the TFT. Changing the electric field changes an orientation of liquid crystal molecules in the liquid crystal layer, and a quantity of light transmitted through the liquid crystal layer is thereby changed to display a desired image. However, the LCD of the prior art suffers from poor visibility due to afterimages, for example, caused by inherent characteristics of the liquid crystal molecules.

Resolution of the LCD is proportional to a number of the unit pixels provided in a unit area. More particularly, as the number of the unit pixels per unit area increases, the resolution increases. However, as the resolution increases, a number of required scanning lines, e.g., gate lines, increases, and a time available to charge the external charges, e.g., the gradation signal, into one pixel electrode is thereby decreased, further hampering the LCD of the prior art in displaying the desired image.

BRIEF SUMMARY OF THE INVENTION

A display device according to an exemplary embodiment of the present invention includes: a plurality of unit pixels arranged in a matrix having pixel columns and pixel rows, the plurality of unit pixels comprising a first unit pixel disposed in a first pixel column and a first pixel row and a second unit pixel disposed in the first pixel column and a second pixel row adjacent to the first pixel row; a first gate line and a second gate line extending in a substantially row direction and each having a gate voltage input pad disposed at a terminal portion thereof; a first data line and a second data line extending in a substantially column direction and connected to the first unit pixel and the second unit pixel, respectively; and a first charge control line extending in substantially the row direction and having a charge control gate voltage input pad disposed at a terminal portion thereof. The first gate line is connected to the first unit pixel and the second gate line is connected to the second unit pixel, and the first gate line and the second gate line simultaneously receive a same gate pulse.

The first unit pixel is connected to the first data line, and the second unit pixel is connected to the second data line.

The first unit pixel includes a first sub pixel and a second sub pixel, the first gate line is electrically connected to the first sub pixel and the second sub pixel, and the first charge control line is electrically connected to at least one of the first sub pixel and the second sub pixel.

The first sub pixel includes a first pixel electrode and a first thin film transistor ("TFT") configured to apply a signal of the first data line to the first pixel electrode based on a gate turn-on voltage supplied to the first TFT by the first gate line.

The second sub pixel includes a second pixel electrode, a second TFT configured to apply the signal of the first data line to the second pixel electrode based on the gate turn-on voltage supplied to the second TFT by the gate line, a charge control electrode and a charge control transistor configured to electrically connect the second pixel electrode to the charge control electrode based on charge control gate turn-on voltage of the first charge control line.

The display device may further include a second charge control line electrically connected to the second unit pixel.

The charge control transistor is electrically connected to a charge down capacitor, a first electrode of which is the charge control electrode, and the first sub pixel and the second sub pixel are charged with different voltages based on an operation of the charge down capacitor.

The unit pixel includes a storage line extending in substantially the column direction, and the storage line includes a protruding portion which overlaps at least a portion of the charge control electrode.

The first gate line may be disposed on the first unit pixel. A first area of the first gate line overlaps a portion of the first pixel electrode and a second area of the second gate line overlaps a portion of the second pixel electrode. A size of the first area is equal to a size of the second area.

The first sub pixel and the second sub pixel include a plurality of domain regions, and orientations of liquid crystals in domain regions of the plurality of domain regions are different.

The first unit pixel may include a thin film transistor which includes: a gate electrode; a gate insulation layer and an active layer disposed on the gate electrode; and one of a source electrode and a drain electrode disposed on the active layer. The active layer is disposed under the first data line, and a shape of the active layer is substantially the same as a shape of the first data line.

In accordance with an alternative exemplary embodiment of the present invention, a method of driving a display device is provided. The display device includes: a plurality of unit pixels arranged in a matrix having pixel columns and pixel rows, the plurality of unit pixels comprising a first unit pixel disposed in a first pixel column and a first pixel row, and a second unit pixel disposed in the first pixel column and a second pixel row adjacent to the first pixel row. The display device further includes a first gate line and a second gate line extending in a substantially row direction and each having gate voltage input pads at respective terminal portions thereof, a first data line and a second data line extending in a substantially column direction and connected to the first unit pixel and the second unit pixel, respectively, and a charge control line extending in the row direction, having a charge control gate voltage input pad disposed at a terminal portion thereof and being electrically connected to the first unit pixel. The method includes simultaneously applying a gate turn-on voltage to the first gate line and the second gate line, charging the first unit pixel with a gray voltage supplied by the first data line, applying a gate turn-off voltage to the first gate line and the second gate line and changing a value of the gray voltage charged into a first sub pixel of the first unit pixel by applying a charge control gate turn-on voltage to charge control line.

The simultaneously applying the gate turn-off voltage to first gate line and the second gate line and the applying the charge control gate turn-on voltage to the charge control line may be performed at the same time.

The applying the gate turn-on voltage to charge control lines may be performed after the simultaneously applying the gate turn-off voltage to the first gate line and the second gate line by a predetermined time.

The charging the first unit pixel with the gray voltage supplied by the first data line may include charging a same gray voltage level to the first sub pixel and a second sub pixel of the first unit pixel.

The changing the value of the gray voltage charged into the first sub pixel may include electrically connecting a charge down capacitor to the first sub pixel by turning on a charge control transistor connected to the charge control line.

BRIEF DESCRIPTION OF THE DRAWINGS

The above and other aspects, features and advantages of the present invention will become more readily apparent by describing in further detail exemplary embodiments thereof with reference to the accompanying drawings, in which.

DETAILED DESCRIPTION OF THE INVENTION

Figure 1:
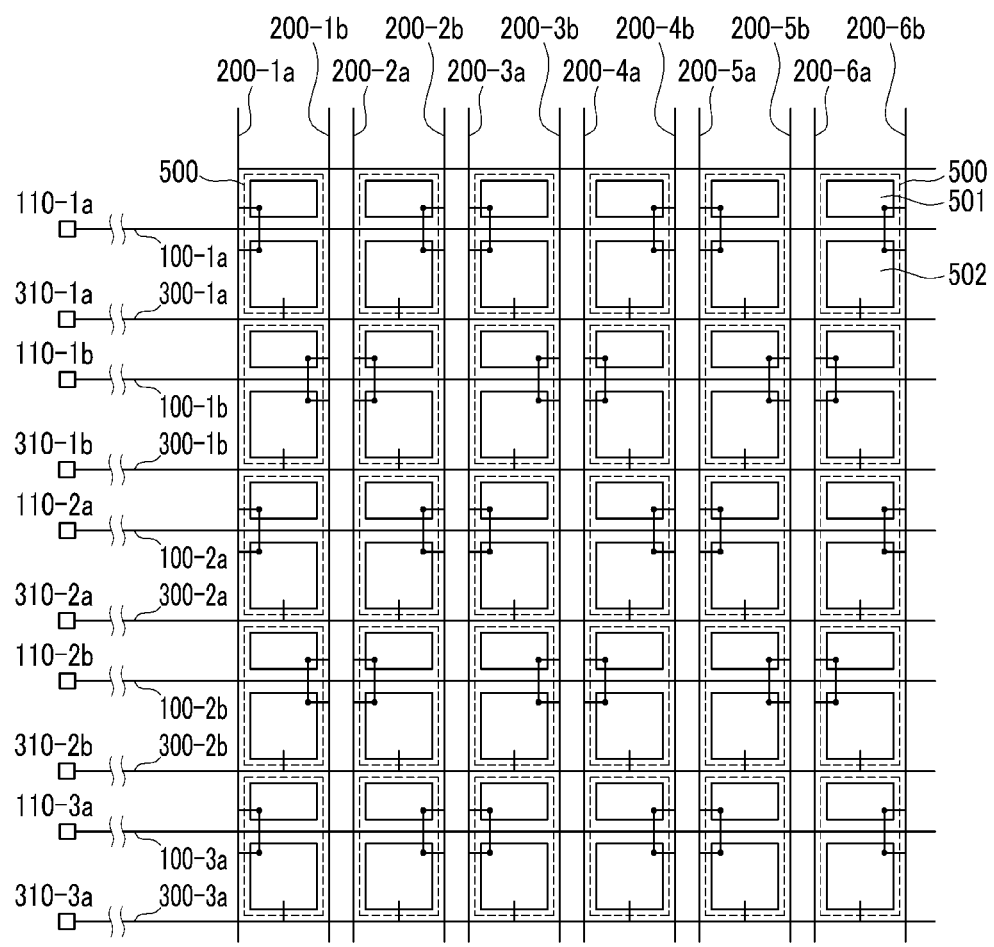
FIG. 1 is a schematic plan view of a display device according to an exemplary embodiment of the present invention.

The invention will now be described more fully hereinafter with reference to the accompanying drawings, in which exemplary embodiments of the invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the device in one of the figures were turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning which is consistent with their meaning in the context of the relevant art and the present disclosure, and will not be interpreted in an idealized or overly formal sense unless expressly so defined herein.

Exemplary embodiments of the present invention are described herein with reference to cross section illustrations which are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes which result, for example, from manufacturing. For example, a region illustrated or described as flat may, typically, have rough and/or nonlinear features. Moreover, sharp angles which are illustrated may be rounded. Thus, the regions illustrated in the figures are schematic in nature and their shapes are not intended to illustrate the precise shape of a region and are not intended to limit the scope of the present invention.

Hereinafter, exemplary embodiments of the present invention will be described in further detail with reference to the accompanying drawings.

Figure 2:
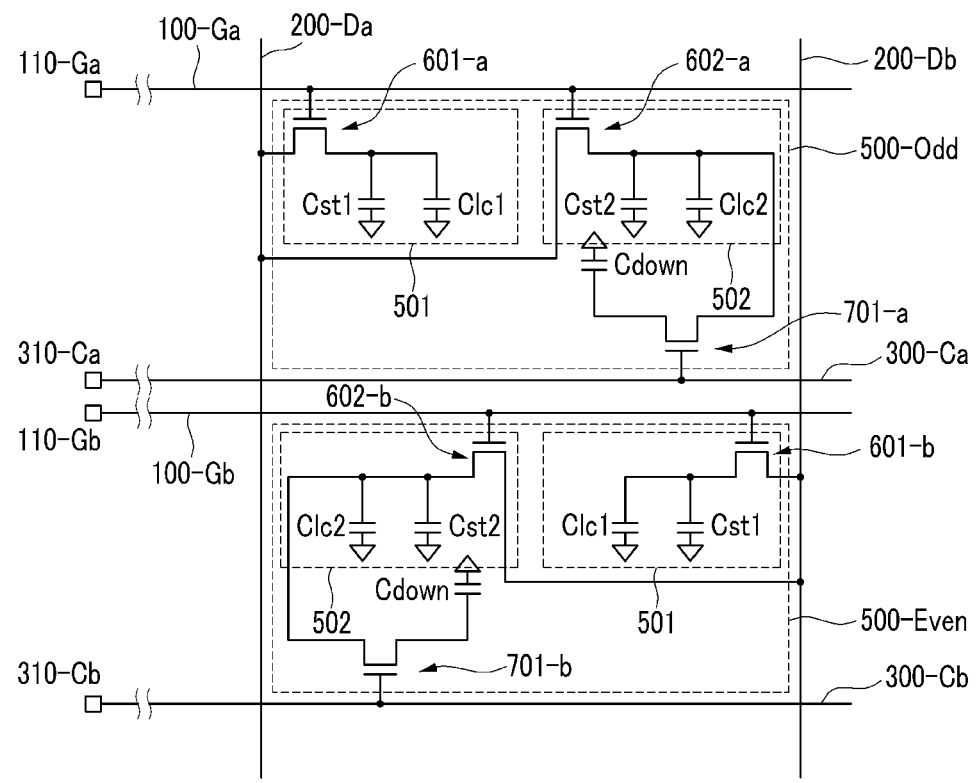
FIG. 2 is a schematic circuit diagram of the display device according to the exemplary embodiment of the present invention shown in FIG. 1.

FIG. 1 is a schematic plan view of a display device according to an exemplary embodiment of the present invention, and FIG. 2 is a schematic circuit diagram of the display device according to the exemplary embodiment of the present invention shown in FIG. 1.

Referring to FIG. 1, the display device according to an exemplary embodiment of the present invention includes unit pixels 500 disposed in a substantially matrix pattern, a plurality of gate lines, e.g., gate lines 100-1a, 100-2a, 100-3a, 100-1b, and 100-2b, a plurality of first data lines, e.g., first data lines 200-1a, 200-2a, 200-3a, 200-4a, 200-5a and 200-6a, a plurality of second data lines, e.g., second data lines 200-1b, 200-2b, 200-3b, 200-4b, 200-5b and 200-6b, and a plurality of charge control lines, e.g., charge control lines 300-1a, 300-2a, 300-3a, 300-1b, 300-2b and 300-3b. The display device according to an exemplary embodiment of the present invention further includes gate voltage input pads 110-1a, 110-1b, 110-2a, 110-2b and 110-3a, as well as charge control gate voltage input pads, e.g., charge control input pads 310-1a, 310-1b, 310-2a, 310-2b and 310-3a, as shown in FIG. 1.

As shown in FIG. 1, the matrix (hereinafter referred to as a "pixel matrix") includes a plurality of the unit pixels 500. Specifically the pixel matrix includes pixel columns aligned in a first direction, e.g., a column direction, and a pixel rows aligned in a second direction, e.g., a row direction substantially perpendicular to the first direction. In an exemplary embodiment, the unit pixels 500 emit red, green and blue light and are sequentially arranged in the pixel row direction, but alternative exemplary embodiments of the present invention are not limited thereto. For example, in an alternative exemplary embodiment, the unit pixels 500 which emit red, green and blue light may be sequentially arranged in the pixel column direction.

Two unit pixels 500 of the plurality of unit pixels 500 will now be described in further detail with reference to FIG. 2. More specifically, in FIG. 2, an odd-numbered pixel 500-Odd connected to the data line 200-1a (FIG. 1), hereinafter referred to, for purposes of convenient description, as a "first data line 200-Da" or a "left-hand data line 200-Da" and an even-numbered pixel 500-Even is connected to the data line 200-1b (FIG. 1), hereinafter referred to as a "second data line 200-Db" or a "right-hand data line 200-Db". In addition, the odd-numbered unit pixel 500-Odd and the even-numbered unit pixel 500-Even each includes a first sub pixel 501 and a second sub pixel 502, but alternative exemplary embodiments are not limited thereto. Alternatively, for example, more than two sub pixels may be provided in each of odd-numbered unit pixel 500-Odd and the even-numbered unit pixel 500-Even. In addition, it will be understood that, for purposes of illustration, only two unit pixels 500 are shown in FIG. 2, but exemplary embodiments are not limited thereto. Instead exemplary embodiments of the present invention include additional columns and/or rows of unit-pixels, alternately labeled even and odd, as shown in FIG. 1.

Still referring to FIG. 2, the first sub pixel 501 of the odd-numbered pixel 500-odd includes a first thin film transistor ("TFT") 601-a, a first liquid crystal capacitor Clc1 and a first storage capacitor Cst1. A gate terminal, e.g., a gate electrode, of the first TFT 601-a is connected to the gate line 100-1a (FIG. 1), hereinafter referred to as a "first gate line 100-Ga".

In addition, a source terminal of the first thin film transistor 601-a is connected to the first data line 200-Da. A drain terminal of the first thin film transistor 601-a is connected to the first liquid crystal capacitor Clc1 and the first storage capacitor Cst1, as shown in FIG. 2.

The first sub pixel 501 of the even-numbered pixel 500-Even includes a first TFT 601-b, a first liquid crystal capacitor Clc1 and a first storage capacitor Cst1. A gate terminal of the first TFT 601-b is connected to the gate line 100-1b (FIG. 1), hereinafter referred to as a "second gate line 100-Gb".

A source terminal of the first TFT 601-b is connected to the second data line 200-Db. A drain terminal of the first thin film transistor 601-b is connected to it's the first liquid crystal capacitor Clc1 and the first storage capacitor Cst1 of the first sub pixel 501 of the even-numbered unit pixel 500-Even, as shown in FIG. 2.

The second sub pixel 502 of the odd-numbered pixel 500-Odd includes a second TFT 602-a, a charge control transistor 701-a, a second liquid crystal capacitor Clc2, a second storage capacitor Cst2 and a charge down capacitor Cdown. A gate terminal of the second TFT 602-a is connected to the first gate line 100-Ga. A source terminal of the second TFT 602-a is connected to the first data line 200-Da. A drain terminal of the first TFT 602-a is connected to the second liquid crystal capacitor Clc2 and the second storage capacitor Cst2. A gate terminal of the charge control transistor 701-a is connected to the charge control line 300-1a (FIG. 1), hereinafter referred to as a "first charge control line 300-Ca". A source terminal of the charge control transistor 701-a is connected to the second liquid crystal capacitor Clc2 and it's a drain terminal thereof is connected to the charge down capacitor Cdown, as shown in FIG. 2.

The second sub pixel 502 of the even-numbered pixel 500-Even includes a second TFT 602-b, a charge control transistor 701-b, a second liquid crystal capacitor Clc2, a second storage capacitor Cst2 and a charge down capacitor Cdown. A gate terminal of the second TFT 602-b is connected to the second gate line 100-Gb. A source terminal of the second TFT 602-b is connected to the second data line 200-Db. A drain terminal of the second TFT 602-b is connected to the second liquid crystal capacitor Clc2 and the second storage capacitor Cst2. A gate terminal of the charge control transistor 701-b is connected to the charge control line 300-1b (FIG. 1), hereinafter referred to as a "second charge control line 300-Cb". A source terminal of the charge control transistor 701-b is connected to the second liquid crystal capacitor Clc2 and it's a drain terminal thereof is connected to the charge down capacitor Cdown, as shown in FIG. 2.

In an alternative exemplary embodiment of the present invention, the odd-numbered unit pixel 500-Odd and the even-numbered unit pixel 500-Even may each further include a charge-up capacitor (not shown). In this case, the drain terminals of each of the charge control transistor 701-1 and the charge control transistor 701-b, respectively, may be connected to a first electrode of the charge-up capacitor Cup. A second electrode of the charge-up capacitor Cup may be connected to the drain terminals of each of the first TFT 601-a and the first TFT 601-b, respectively.

Referring again to FIG. 1, the gate lines 100-1a, 100-2a and 100-3a, 100-1b, 100-2b and 100-3b extend substantially in the row direction of the pixel matrix. In addition, the gate lines 100-1a, 100-2a, 100-3a, 100-1b, 100-2b and 100-3b are connected to corresponding unit pixels 500 in pixel rows of the pixel matrix. More specifically, one of the gate lines 100-1a, 100-2a and 100-3a, 100-1b, 100-2b and 100-3b is connected to a corresponding one of the pixel rows. As a result, each of the gate lines 100-1a, 100-2a and 100-3a, 100-1b, 100-2b and 100-3b is disposed to pass through a unit pixel region, as illustrated in FIG. 1. More specifically, each of the gate lines 100-1a, 100-2a, 100-3a, 100-1b, 100-2b and 100-3b overlaps at least a portion of each of the unit pixel regions, but alternative exemplary embodiments are not limited thereto. Alternatively, for example, each of the gate lines 100-1a, 100-2a and 100-3a, 100-1b, 100-2b and 100-3b may extend along an outer periphery of each of the unit pixel regions.

Still referring to FIG. 1, the data lines 200-1a, 200-2a, 200-3a, 200-4a, 200-5a, 200-6a, 200-1b, 200-2b, 200-3b, 200-4b, 200-5b and 200-6b extend substantially in the column direction of the pixel matrix. Further, the data lines 200-1a, 200-2a, 200-3a, 200-4a, 200-5a, 200-6a, 200-1b, 200-2b, 200-3b, 200-4b, 200-5b and 200-6b are connected to associated pixel columns of the pixel matrix. Specifically, two data lines are both connected to a given pixel column. More specifically, one of the first data lines 200-1a, 200-2a, 200-3a, 200-4a, 200-5a and 200-6a is connected to a given pixel column, while one of the second data lines 200-1b, 200-2b, 200-3b, 200-4b, 200-5b and 200-6b is also connected to the given pixel column. For example, as best shown in FIG. 2, the first data line 200-Da (e.g., the left-hand data line 200-Da, corresponding to the data line 200-1a of FIG. 1) and the second data line 200-Db (e.g., the right-hand data line 200-Db corresponding to the data line 200-1b of FIG. 1) are both connected to unit pixels 500 in the pixel column including the odd-numbered unit pixel 500-Odd and the even-numbered pixel column 500-Even, as shown in FIG. 2

Thus, as illustrated in FIG. 1 and in the context of the more detailed description above with reference to FIG. 2, in an exemplary embodiment of the present invention, one first data line 200-1a, 200-2a, 200-3a, 200-4a, 200-5a and 200-6a of a plurality of first data lines 200-1a, 200-2a, 200-3a, 200-4a, 200-5a and 200-6a is disposed at a left side of a corresponding pixel column, while one second data line 200-1b, 200-2b, 200-3b, 200-4b, 200-5b and 200-6b of a plurality of second data lines 200-1b, 200-2b, 200-3b, 200-4b, 200-5b and 200-6b is disposed at an opposite right side of the corresponding pixel column. Further, Odd-numbered unit pixels 500 in the corresponding pixel column are connected to the first data lines 200-1a, 200-2a, 200-3a, 200-4a, 200-5a and 200-6a or, alternatively, to the second data lines 200-1b, 200-2b, 200-3b, 200-4b, 200-5b and 200-6b. Likewise, even-numbered unit pixels 500 of the corresponding pixel column are connected to remaining data lines, e.g., to data lines to which the odd-numbered unit pixels 500 are not connected.

In an exemplary embodiment of the present invention, same gate driving pulse is applied to adjacent gate lines (e.g., to the first gate line 100-Ga and the second gate line 100-Gb of FIG. 2) which are connected to adjacent unit pixels 500.

As a result, an amount of time allocated to each gate line for applying a gate turn-on voltage is substantially increased for each gate line, even when a number of gate lines is increased to improve resolution. More specifically, in an exemplary embodiment of the present invention in which the resolution increases from 1,920×1,080 to 4,096×2,160, for example, 1,080 gate lines are required to realize 1,920×1,080 resolution. In contrast, 2,160 gate lines are required to realize 4,096×2,160 resolution. However, an amount of time allocated time for displaying one image frame is identical in both cases. For purposes of illustration, both cases will be described based on an assumption that the amount of time allocated for displaying one image frame is, for example, 1 (one) second. In the case of the display device having 1,080 gate lines, the gate turn-on voltage is applied for one second to all the gate lines, e.g., 1,080 gate lines, and, accordingly, the amount of time allocated to a single gate line for applying the gate turn-on voltage is $\frac{1}{1,080}$ second. In the case of the display device having 2,160 gate lines, however, the gate turn-on voltage is applied for one second to all of the 2,160 gate lines, and accordingly the time allocated to one gate line for applying the gate turn-on voltage is decreased to $\frac{1}{2,160}$ second. That is, if the resolution is doubled, the amount of time allocated for applying the gate turn-on voltage to one gate line is reduced by half.

However, in an exemplary embodiment of the present invention, the gate turn-on voltage is simultaneously applied to two gate lines, e.g., to a first gate line 100-1a and a second gate line 100-1b (FIG. 1), and an amount of time allocated to one gate line e.g., to the first gate line 100-1a or the second gate line 100-1b, for applying the gate turn-on voltage is thereby not reduced, even when a number of gate lines is increased.

Since the gate turn-on voltage is simultaneously applied to the two gate lines, e.g., to the first gate line 100-1a and the second gate line 100-1b, which are adjacent to each other, two pixel rows connected to the two gate lines, e.g., to the first gate line 100-1a and the second gate line 100-1b operate at the same time. As a result, the first TFT 601 and the second TFT 602 in two unit pixels 500 vertically adjacent to each other are simultaneously turned on. In this case first TFT 601 and the second TFT 602, a resolution of a display device cannot be increased because the vertically adjacent two unit pixels display a same image. Accordingly, in the display device according to an exemplary embodiment of the present invention, the first TFT 601 and the second TFT 602 are disposed in an upper unit pixel 500, for example, are connected to one of the first data lines 200-1a, 200-2a, 200-3a, 200-4a, 200-5a and 200-6a, while the first TFT 601 and the second TFT 602 disposed in an adjacent lower unit pixel 500 are connected to one of the second data lines 200-1b, 200-2b, 200-3b, 200-4b, 200-5b and 200-6b. As a result, different gradation signals, e.g., different charges, are applied to the associated first data line 200-1a, 200-2a, 200-3a, 200-4a, 200-5a, 200-6a, and the associated second data line 200-1b, 200-2b, 200-3b, 200-4b, 200-5b and 200-6b, respectively. Consequently, the vertically adjacent two unit pixels 500 display different images, and a resolution of the display device is thereby substantially enhanced.

As described above, the display device according to an exemplary embodiment includes the charge control lines 300-1a, 300-2a, 300-1b and 300-2b for controlling an amount of charges in each of the first sub pixel 501 and the second sub pixel 502 of the unit pixel 500. More specifically, the charge control lines 300-1a, 300-2a, 300-1b and 300-2b extend substantially in the row direction of the pixel matrix, and are connected to pixel rows thereof. The charge control lines 300-1a, 300-2a, 300-1b and 300-2b are electrically insulated from the gate lines 100-1a, 100-2a, 100-3a, 100-1b, 100-2b and 100-3b.

In an exemplary embodiment, the gate turn-on voltage is applied to the gate lines 100-1a, 100-2a, 100-3a, 100-1b, 100-2b or 100-3b to accumulate substantially the same charges in the first sub pixel 501 and the second sub pixel 502. As a result, when a gate turn-off voltage is applied to the gate lines 100-1a, 100-2a, 100-3a, 100-1b, 100-2b or 100-3b, the gate turn-on voltage, which turns on the charge control transistor 701, is also applied to the charge control lines 300-1a, 300-2a, 300-1b and 300-2b. Therefore, an amount of charges in at least one of the first sub pixel 501 and the second sub pixel 502 changes. Specifically, in an exemplary embodiment, an amount of charge in the second sub pixel 502 is reduced to thereby substantially improve visibility.

In an exemplary embodiment, the gate turn-on voltage to turn on the charge control transistor 701 is applied to the charge control lines 300-1a, 300-2a, 300-1b and 300-2b when the gate turn-off voltage is applied to the gate lines 100-1a, 100-2a, 100-3a, 100-1b, 100-2b or 100-3b, but alternative exemplary embodiments are not limited thereto. For example, in an alternative exemplary embodiment of the present invention, the gate turn-on voltage may be applied to the charge control transistor 701 some time after the gate turn-off voltage is applied to the gate lines 100-1a, 100-2a, 100-3a, 100-1b, 100-2b or 100-3b.

Figure 3:
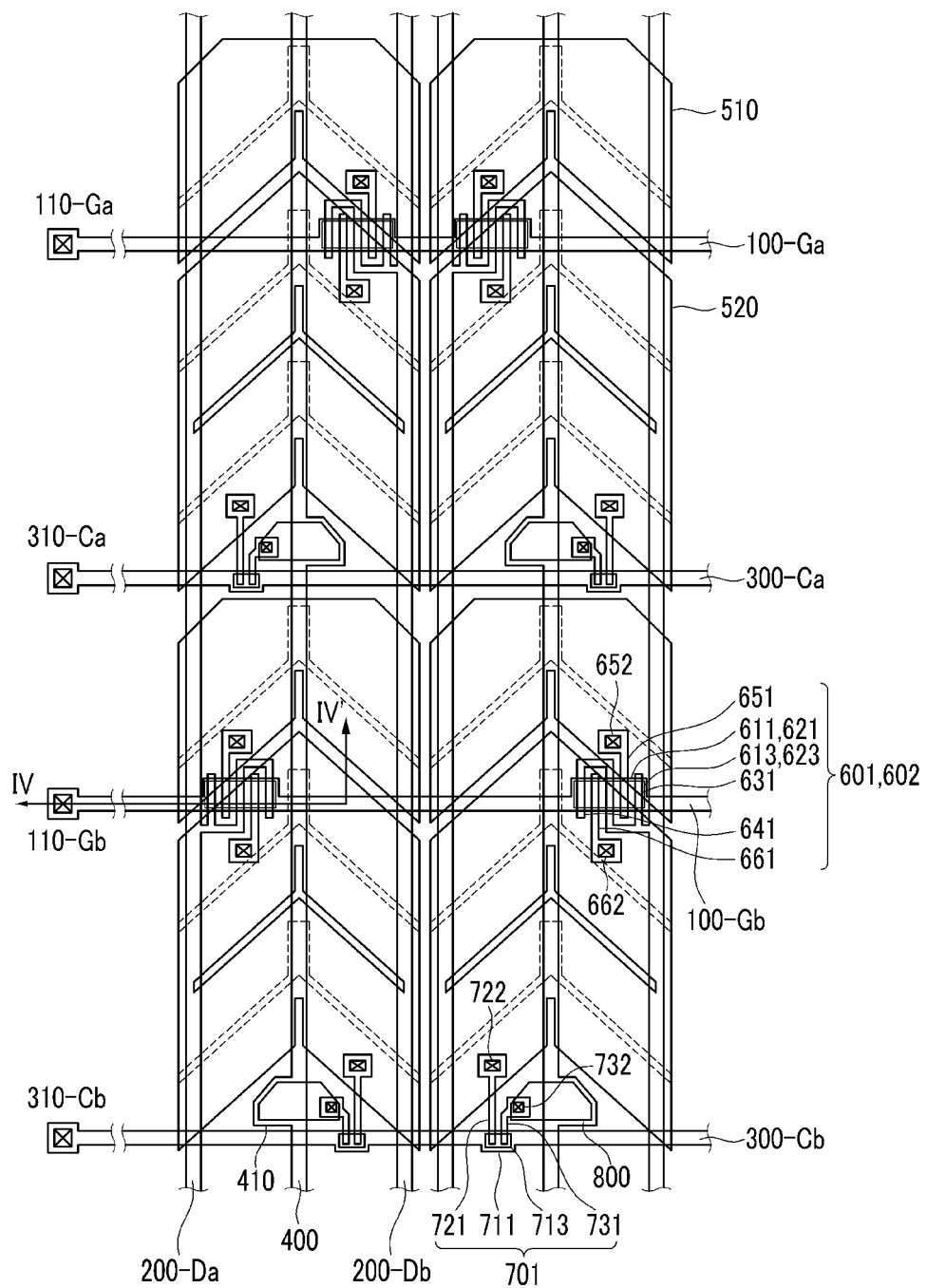
FIG. 3 is a plan view of the display device according to the exemplary embodiment of the present invention shown in FIG. 1.

Referring now to FIG. 2, the first gate line 100-Ga and the second gate line 100-Gb, as well as the first charge control line 300-Ca and the second charge control line 300-Cb, extend in substantially the row direction. In addition, the first gate line 100-Ga and the second gate line 100-Gb, as well as the first charge control line 300-Ca and the second charge control line 300-Cb, each have a gate voltage input pad disposed at one terminal thereof. FIG. 3 is a plan view of the display device according to the exemplary embodiment of the present invention shown in FIG. 1 and FIG. 4 is a partial cross-sectional view taken along line IV-IV' of FIG. 3.

Figure 4:
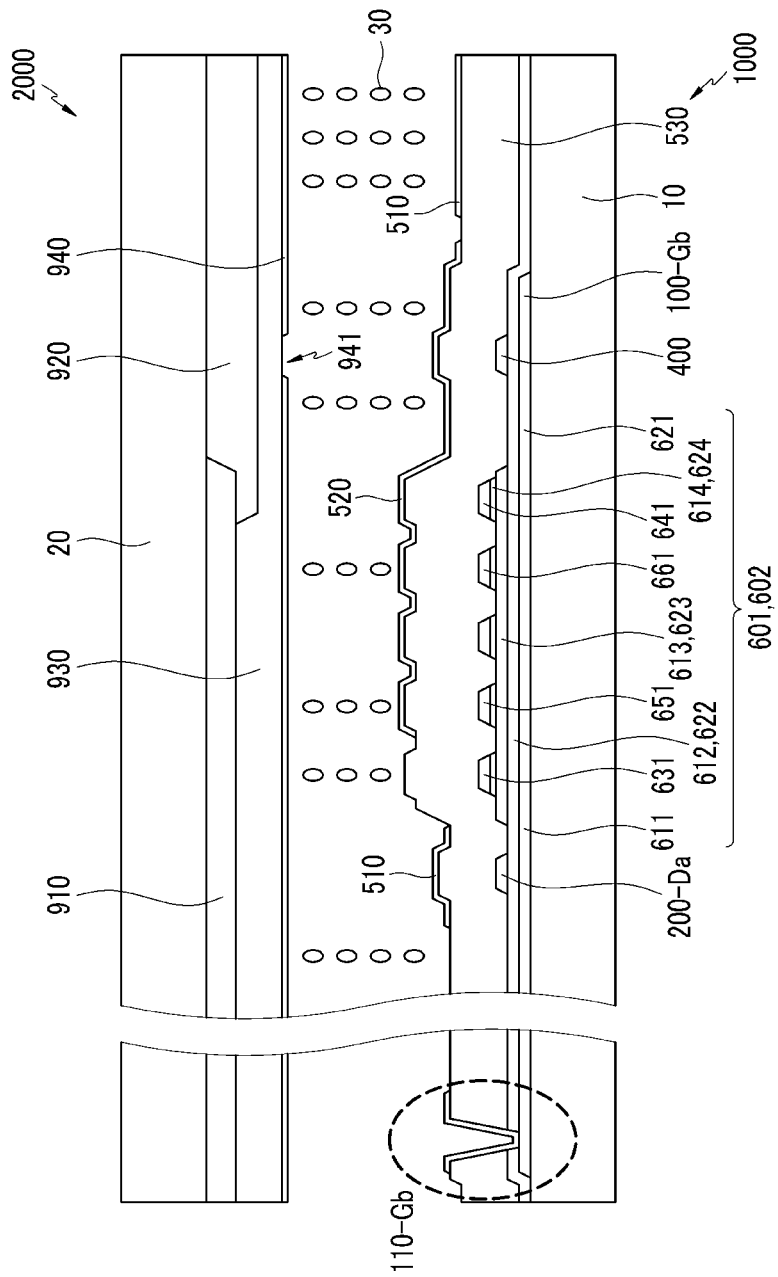
FIG. 4 is a partial cross-sectional view taken along line IV-IV' of FIG. 3.

Referring to FIGS. 3 and 4, the display device according to an exemplary embodiment of the present invention includes a TFT substrate 1000 as a lower substrate 1000, a common electrode substrate 2000 disposed opposite to, e.g., facing, the TFT substrate 1000 as an upper substrate 2000, and liquid crystals 30 disposed between TFT substrate 1000 and the common electrode substrate 2000.

An alignment layer (not shown) may be disposed on surfaces of the lower substrate 1000 and/or the upper substrate 2000 to align liquid crystals molecules of the liquid crystals 30.

In an exemplary embodiment of the present invention, an alignment mode of the liquid crystals 30 may be a vertical alignment mode, e.g., the liquid crystals 30 may be vertically aligned with respect to the upper substrate 2000 and the lower substrate 100, but alternative exemplary embodiments are not limited thereto.

The TFT substrate 1000 includes a transparent insulation substrate 10. The transparent insulation substrate 10 may include, for example, glass or transparent plastic, but alternative exemplary embodiments are not limited thereto.

The TFT substrate 1000 according to an exemplary embodiment includes the first gate line 100-Ga and the second gate line 100-Gb, described in greater detail above with reference to FIG. 2, extending in substantially the row direction on the transparent insulation substrate 10. Portions of the first gate line 100-Ga and the second gate line 100-Gb protrude in substantially the second, e.g., column, direction to form a first gate terminal and a second gate terminal, respectively, of the first TFT 601 and the second TFT 602, respectively. In an exemplary embodiment, the first gate line 100-Ga and the second gate line 100-Gb may have a monolayer structure or, alternatively, a multilayered structure including two or more layers. In a case where the first gate line 100-Ga and the second gate line 100-Gb have a multilayered structure with two or more layers, one layer may be formed of a low-resistance material and other layers may be formed of a material having good contact characteristics with other materials. For example, the first gate line 100-Ga and the second gate line 100-Gb according to an exemplary embodiment of the present invention may include a first layer of chromium (Cr) and a second layer of aluminum (Al) (or Al alloy) or, alternatively, a bi-layer including a first layer of Al (or Al alloy) and a second layer of molybdenum (Mo), but alternative exemplary embodiments are not limited thereto. Alternatively, for example, the first gate line 100-Ga and the second gate line 100-Gb may include various metal and/or conductive materials.

The TFT substrate 1000 according to an exemplary embodiment of the present invention includes the first charge control line 300-Ca and the second charge control line 300-Cb extending in substantially the same direction, e.g., in the row direction, as the first gate line 100-Ga and the second gate line 100-Gb. Portions of the first charge control line 300-Ca and the second charge control line 300-Cb protrude in substantially the column direction to form a gate terminal 711 of the charge control transistor 701. In an exemplary embodiment of the present invention, the first charge control line 300-Ca and the second charge control line 300-Cb are formed of substantially the same material as the first gate line 100-Ga and the second gate line 100-Gb, as well as on substantially the same plane defined thereby.

The first gate line 100-Ga, the second gate line 100-Gb, the first charge control line 300-Ca and the second charge control line 300-Cb have gate voltage input pads 110, 310, respectively, disposed at a terminal of respective gate lines and charge control line, as shown in FIG. 3. More specifically, a first gate voltage input pad 110-Ga and a second gate voltage input pad 110-Gb are disposed at ends of the first gate line 100-Ga and the second gate line 100-Gb, respectively. Likewise, a first charge control gate voltage input pad 310-Ca and a second charge control gate voltage input pad 310-Cb are disposed at ends of the first charge control line 300-Ca and the second charge control line 300-Cb, respectively.

Further, the gate voltage input pads 110, 310 are formed in an outer peripheral region of the TFT substrate 1000 and, during operation, provide a gate voltage which is inputted from the external circuit (not shown) to the first gate line 100-Ga, the second gate line 100-Gb, the first charge control line 300-Ca and the second charge control line 300-Cb.

As described above in further detail with reference to FIGS. 1 and 2, the gate voltage is inputted from the external circuit such that after a gate turn-on voltage is applied to adjacent gate lines connected to two adjacent unit pixels, the gate turn-on voltage for turning on associated charge control transistors is applied to adjacent charge control lines connected to the two adjacent unit pixels.

Still referring to FIGS. 3 and 4, the TFT substrate 1000 according to an exemplary embodiment of the present invention includes the first data line 200-Da and the second data line 200-Db which intersect the first gate line 100-Ga and the second gate line 100-Gb. The first data line 200-Da and the second data line 200-Db are disposed substantially adjacent to the left and the right sides of the pixel column of the pixel matrix, as described above in greater detail with reference to FIGS. 1 and 2. Portions of the first data line 200-Da and the second data line 200-Db protrude to form a first source terminals 631 and a second source terminal 641, respectively, of the first TFT 601 and the second TFT 602, respectively. The first data line 200-Da and the second data line 200-Db according to an exemplary embodiment of the present invention may have a monolayer structure or, alternatively, a multilayered structure including two or more layers having different physical properties. In an exemplary embodiment wherein the first data line 200-Da and the second data line 200-Db are formed to have the multilayered structure with two or more layers, one layer may include a low-resistance material (to reduce a delay of a data signal and/or a voltage drop), while other layers may be formed of a material having good contact characteristics with other materials. Although the first data line 200-Da and the second data line 200-Db are illustrated in FIG. 3 to have a substantially rectilinear shape, alternative exemplary embodiments of the present invention are not limited thereto. For example, the first data line 200-Da and the second data line 200-Db according to an alternative exemplary embodiment of the present invention may have shapes which include, but are not limited to, a straight line having periodically alternating bends therein or, alternatively, a curved line.

The TFT substrate 1000 according to an exemplary embodiment of the present invention further includes a plurality of storage lines 400 extending through a region substantially defined between the first data line 200-Da and the second data line 200-Db. More specifically, storage lines 400 of the plurality of storage lines 400 extend substantially parallel to the first data line 200-Da and the second data line 200-Db. The storage line 400 according to an exemplary embodiment of the present invention may be formed of substantially the same material as the first data line 200-Da and the second data line 200-Db and on substantially the same plane defined therewith. The storage line 400 is used as electrode terminals of the first storage capacitor Cst1 and the second storage capacitor Cst2. As illustrated in FIG. 3, a portion of the storage line 400 protrudes in substantially the row direction to form a protrusion 410. In an exemplary embodiment, the protrusion 410 is used as an electrode terminal of the charge down capacitor Cdown.

The storage line 400 may pass through a central region of the unit pixel in substantially the column direction. The first TFT 601 and the second TFT 602 in each of the unit pixels 500 arranged in the column direction are alternately arranged at a left side and a right side of the storage line 400. Thus, when there are two unit pixels 500 in a same pixel column, as illustrated in FIG. 3, the first TFT 601 and the second TFT 602 in an upper unit pixel are disposed at the right side of the storage line 400, while the first TFT 601 and the second TFT 602 in a lower unit pixel 500 are disposed at the left side of the storage line 400.

The TFT substrate 1000 includes a first pixel electrode 510 and a second pixel electrode 520. The first pixel electrode 510 is an electrode terminal of the first liquid crystal capacitor Clc1 and the first storage capacitor Cst1, and the second pixel electrode 520 is an electrode terminal of the second liquid crystal capacitor Clc2 and the second storage capacitor Cst2. The first pixel electrode 510 and the second pixel electrode 520 are formed of a transparent conductive material such as indium tin oxide ("ITO") or indium zinc oxide ("IZO"), for example. The first pixel electrode 510 and the second pixel electrode 520 are provided in each unit pixel region. The first pixel electrode 510 and the second pixel electrode 520 are spaced apart from each other by a cut-out portion, as shown in FIG. 3. In an exemplary embodiment of the present invention, the cut-out portion may have a shape of a "V", as illustrated in FIG. 3. In addition, the first pixel electrode 510 is disposed at an upper side of the unit pixel region, and the second pixel electrode 520 is disposed at a lower side of the unit pixel region. The first pixel electrode 510 and the second pixel electrode 520 include a plurality of domains. Cut-out patterns and/or protrusions are used to divide, e.g., to separate, domains of the plurality of domains.

In an exemplary embodiment of the present invention, the first pixel electrode 510 and the second pixel electrode 520 may be symmetrically arranged with respect to, e.g., mirrored about, the storage line 400. In an exemplary embodiment of the present invention, an insulation layer (not shown) is disposed between the first pixel electrode 510 and the second pixel electrode 520 and underlying structures, e.g., the first TFT 601, the second TFT 602, the first gate line 100-Ga, the second gate line 100-Gb, the first data line 200-Da, the second data line 200-Db and/or the storage line 400. An organic layer and/or an inorganic layer may be used as the insulation layer.

In an exemplary embodiment, the first gate line 100-Ga and the second gate line 100-Gb are disposed to cross a region between the first pixel electrode 510 and the second pixel electrode 520, e.g., the cut-out region, in the substantially row direction, as illustrated in FIG. 3. As the first gate line 100-Ga and the second gate line 100-Gb are disposed inside the unit pixel region, an overlapping area between the first gate line 100-Ga and the second gate line 100-Gb and the first pixel electrode 510 and the second pixel electrode 520 becomes uniform. Thus, parasitic capacitance occurring in the overlapping area is substantially reduced and/or effectively eliminated.

Thus, the TFT substrate 1000 according to an exemplary embodiment of the present invention includes the first TFT 601 and the second TFT 602 connected to one of the first data line 200-Da and the second data line 200-Db, respectively, and one of the first gate line 100-Ga and the second gate line 100-Gb, respectively.

Still referring to FIGS. 3 and 4, the first TFT 601 according to an exemplary embodiment of the present invention includes a first gate terminal 611, a first source terminal 631 and a first drain terminal 651. Likewise, the second TFT 602 includes a second gate terminal 621, a second source terminal 641 and a second drain terminal 661. The first TFT 601 further includes a gate insulating layer 612 on the first gate terminal 611, an active layer 613 on the gate insulating layer 612 and an ohmic contact layer 614. The second TFT 602 also further includes a gate insulating layer 622 on the second gate terminals 621, an active layer 623 on the gate insulating layer 622 and an ohmic contact layer 624. As illustrated in FIGS. 3 and 4, the first gate terminal 611 and the second gate terminal 621 are formed as a single body. The gate insulating layers 612 and 622 according to an exemplary embodiment of the present invention may include a silicon nitride layer or, alternatively, a silicon oxide layer. The active layers 613 and 623 are disposed on the first gate terminal 611 and the second gate terminal 621, respectively. The first source terminal 631 and the second source terminal 641 are formed on the active layers 613 and 623, respectively. The first drain terminal 651 is connected to the first pixel electrode 510 through a first pixel contact hole 652. The second drain terminal 661 is connected to the second pixel electrode 520 through a second pixel contact hole 662.

In an exemplary embodiment of the present invention, the active layers 613 and 623 are positioned only the first gate terminal 611 and the second gate terminal 621, respectively, and may also be positioned proximate to the first drain terminal 651 and the second drain terminal 661, respectively. Specifically, the active layers 613 and 623 may be positioned a lower regions of the first data line 200-Da and the second data line 200-Db. In this case, the active layers 613 and 623 are disposed under the first data line 200-Da and the second data line 200-Db, and the first data line 200-Da and the second data line 200-Db, as well as the active layers 613 ad 623 have substantially the same planar shape.

The charge control transistor 701 includes the gate terminal 711 connected to the first charge control line 300-Ca and the second charge control line 300-Cb, a gate insulating layer (not shown) disposed on the gate terminal 711, an active layer 713 disposed on the gate insulating layer over the gate terminal 711, a source terminal 721 and a drain terminal 731 disposed on the active layer 713. The source terminal 721 is connected to the second pixel electrode 520 through a source contact hole 722. The drain terminal 731 is connected to a charge control electrode 800 through a drain contact hole 732. The charge control electrode 800 is used as an electrode terminal of the charge down capacitor Cdown. Thus, a portion of the charge control electrode 800 overlaps the protrusion 410 of the storage line 400, as shown in FIG. 3. As a result, when the charge control transistor 701 is turned on, charge which has accumulated in the second pixel electrode 520 is transferred to the charge control electrode 800 via the charge control transistor 701. The charge control electrode 800 is formed between each of the first pixel electrode 510 and the second pixel electrode 520. Specifically, the charge control electrode 800 is disposed in the cut-out region at the lower side of the second pixel electrode 520, and the charge control transistor 701 is disposed in a region adjacent to the cut-out region at the lower side of the second pixel electrode 520. Thus, a required length of an interconnection for connecting the charge control electrode 700 to the charge control transistor 701 and/or the first pixel electrode 510 and the second pixel electrode 520 is substantially reduced and/or effectively minimized, thereby substantially reducing an aperture ratio of the display device according to an exemplary embodiment of the present invention.

Still referring to FIGS. 3 and 4, in an exemplary embodiment of the present invention, the common electrode substrate 2000 includes a light transmitting insulating substrate 20, a light shielding pattern 910, color filters 920, an overcoat layer 930 disposed on the light shielding pattern 910 and the color filters 920, and a common electrode 940 disposed on the overcoat layer 930. In an exemplary embodiment of the present invention, the color filters 920 include red, green and/or blue color filters 920. The light shielding pattern 910 prevents light leakage and/or light interference between the adjacent unit pixel regions. In an exemplary embodiment of the present invention, a black matrix 910 is used as the light shielding pattern 910. In addition, the overcoat layer 930 according to an exemplary embodiment includes an organic material. The common electrode 940 is formed of a transparent conductive material such as ITO or IZO, for example.

A plurality of cut-out patterns 941 are provided in the common electrode 940 for controlling the domains (described in greater detail above), but alternative exemplary embodiments of the present invention are not limited thereto. Alternatively, protrusions, for example, may be employed to control the domains.

The common electrode 940 is an electrode terminal of each of the first liquid crystal capacitor Clc1 and the second liquid crystal capacitor Clc2. Specifically, in the first liquid crystal capacitor Clc1, the first pixel electrode 510 is an upper electrode, the common electrode 940 is a lower electrode, and the liquid crystals 30 act as a dielectric therebetween. Similarly, in the second liquid crystal capacitor Clc2, the second pixel electrode 520 is an upper electrode, the common electrode 940 is a lower electrode, and the liquid crystals 30 act as a dielectric therebetween.

The TFT substrate 1000 and the common electrode substrate 2000 are attached to each other with the liquid crystals 30 interposed therebetween to manufacture a base panel of the display device according to an exemplary embodiment of the present invention. In addition, the display device may further include a polarization film, a backlight and an optical plate/sheet, for example, disposed at sides of the base panel.

Thus, in an exemplary embodiment, the gate turn-on voltage is applied to the first gate line 100-Ga and the second gate line 100-Gb adjacent thereto. As a result, a charging time, e.g., a gate turn-on time of a TFT, can be prevented from being reduced, even when the resolution is increased. In addition, a unit pixel can be manufactured to include the first sub pixel and the second sub pixel, and a charge controller which is driven based a next gate turn-on voltage, e.g., a temporally subsequent and adjacent gate turn-on voltage, thus controls an amount of charge in the second sub pixel. In an exemplary embodiment of the present invention, the first sub pixel is a main pixel representing a high gradation, while the second sub pixel is a sub pixel representing a low gradation. Therefore, a visibility, e.g., a display quality, of the display device according to an exemplary embodiment of the present invention is substantially improved.

Hereinafter, a method of fabricating the display device according to an exemplary embodiment of the present invention will be described in further detail.

Figure 5:
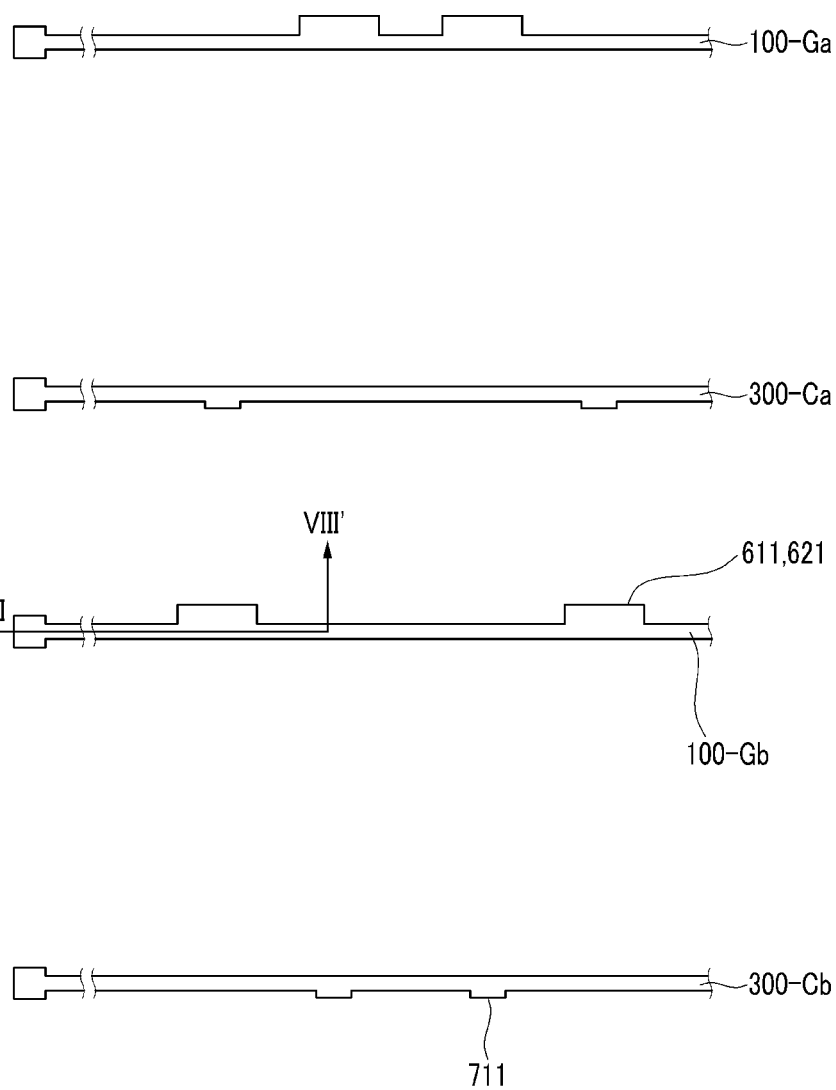
FIGS. 5 through 7 are plan views illustrating steps of a method of fabricating a thin film transistor ("TFT") substrate according to an exemplary embodiment of the present invention.
Figure 6:
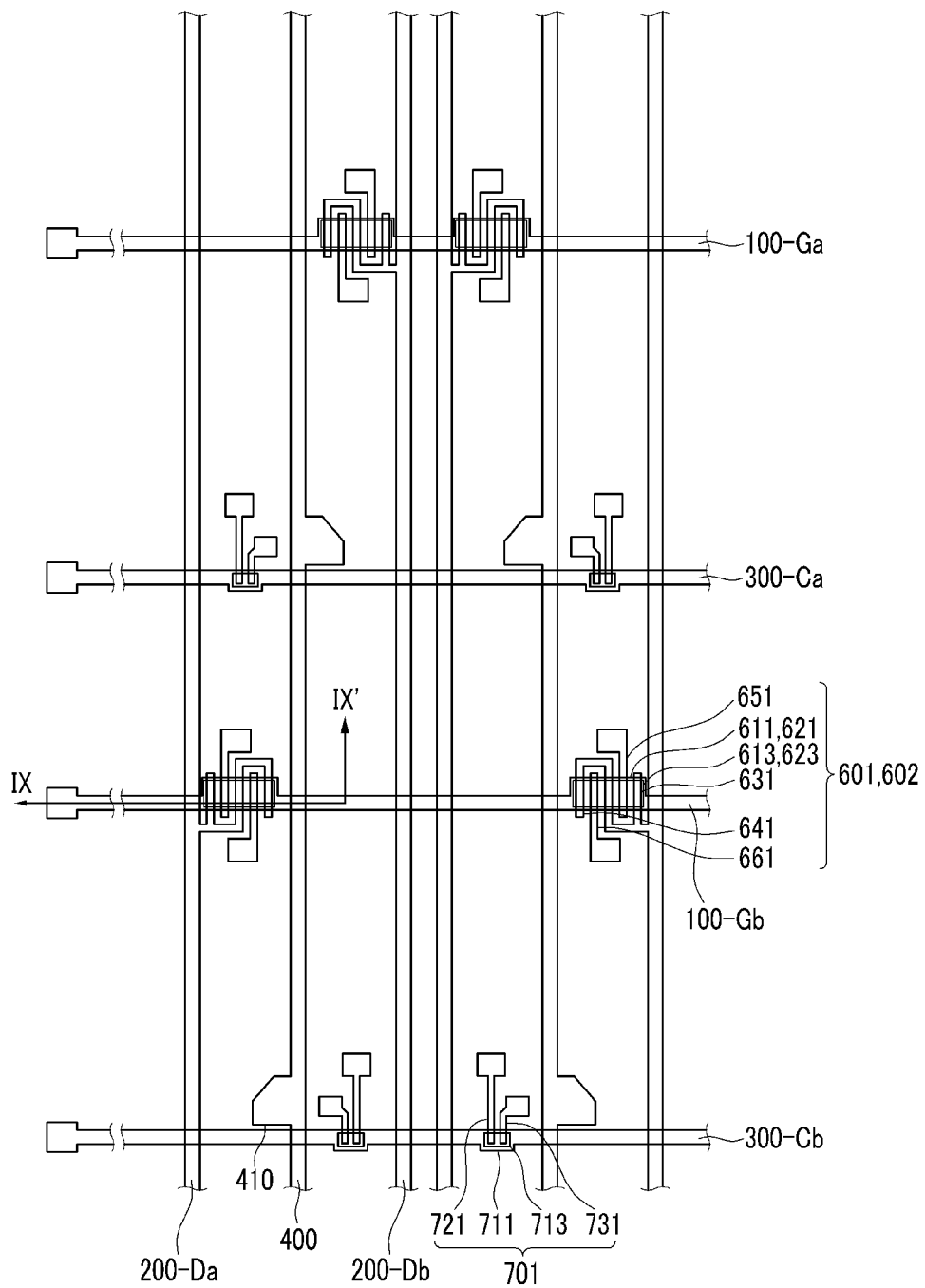
Figure 7:
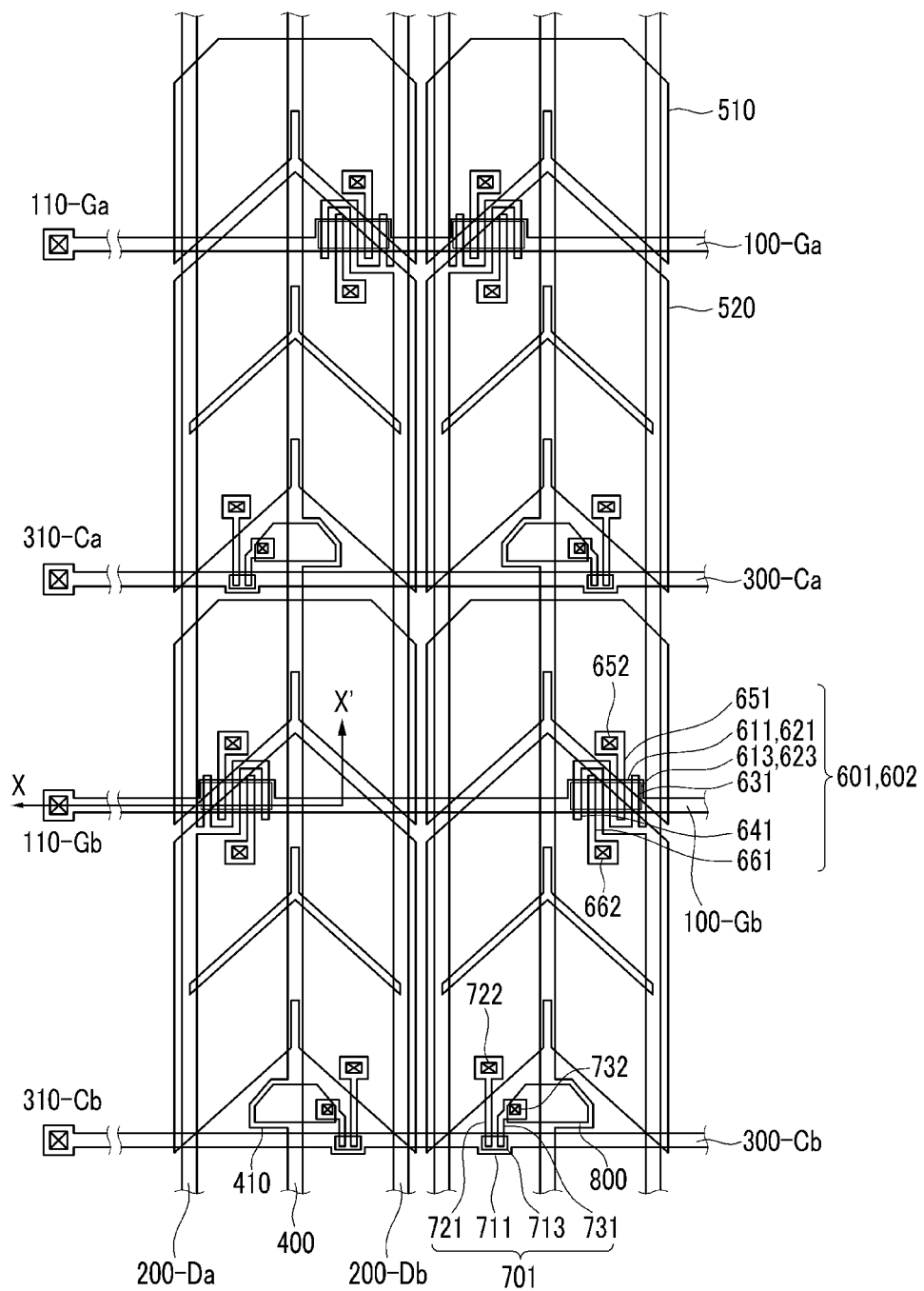
Figure 8:
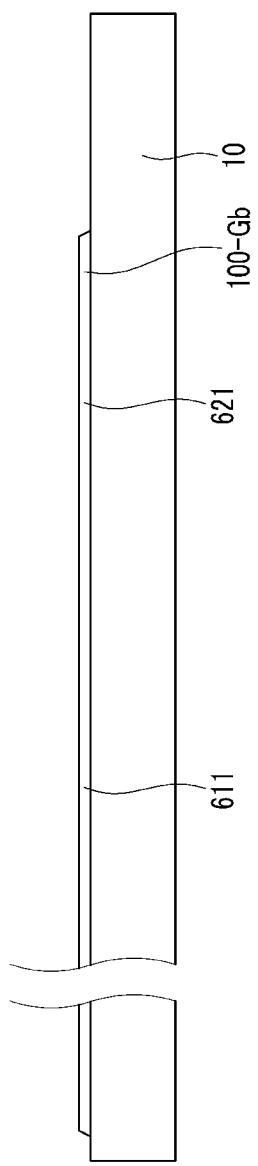
FIG. 8 is a partial cross-sectional view taken along line VIII-VIII' of FIG. 5.
Figure 9:
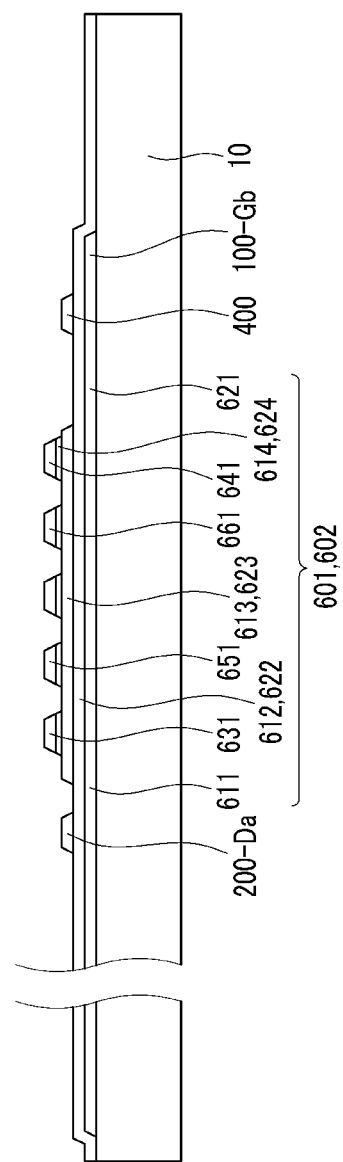
FIG. 9 is a partial cross-sectional view taken along line IX-IX' of FIG. 6.
Figure 10:
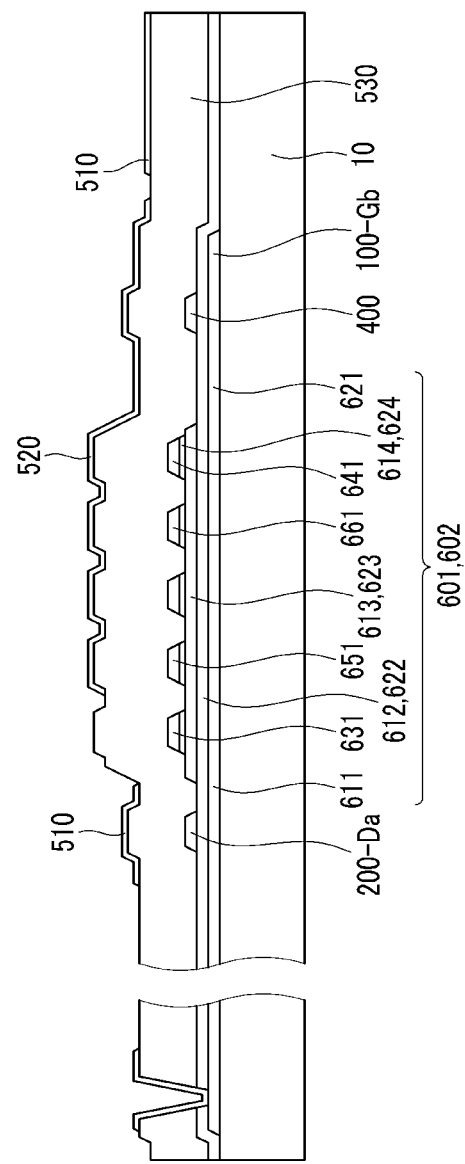
FIG. 10 is a partial cross-sectional view taken along line X-X' of FIG. 7.

FIGS. 5 through 7 are plan views illustrating steps of a method of fabricating a TFT substrate according to an exemplary embodiment of the present invention. FIG. 8 is a partial cross-sectional view taken along line VIII-VIII' of FIG. 5, FIG. 9 is a partial cross-sectional view taken along line IX-IX' of FIG. 6, and FIG. 10 is a partial cross-sectional view taken along line X-X' of FIG. 7. The same reference characters in FIGS. 5-9 refer to the same or like components as in FIGS. 1-4, and any repetitive detailed description thereof will hereinafter be omitted.

Referring to FIGS. 5 and 8, a first conductive layer is formed on a substrate 10. The first conductive layer (not fully shown) is patterned to form the first gate line 100-Ga, the second gate line 100-Gb, the first charge control line 300-Ca and the second charge control line 300-Cb. The gate voltage input pads 110 and the charge control gate voltage input pads 310 are formed at respective terminals of the first gate line 100-Ga, the second gate line 100-Gb, the first charge control line 300-Ca and the second charge control line 300-Cb. Gate terminals 611 and 621 of first and second TFTs and a gate terminal 711 of a charge control transistor (described in greater detail above with reference to FIGS. 1-4) are simultaneously formed.

In an exemplary embodiment of the present invention, the first conductive layer may include at least one of Cr, MoW, Cr/Al, Cu, Al (Nd), Mo/Al, Mo/Al (Nd), Cr/Al (Nd), Mo/Al/Mo and combinations thereof, but alternative exemplary embodiments of the present invention are not limited thereto. For example, the first conductive layer may include at least one of Al, Nd, Ag, Cr, Ti, Ta, Mo and combinations thereof, or an alloy including at least one of the foregoing elements. Further, the first conductive layer may be formed to have a monolayer or, alternatively, a multilayered structure. Specifically, the first conductive layer may be a bi-layer structure or, alternatively, a tri-layer structure including a metal layer having good physical and chemical properties, such as Cr, Ti, Ta and Mo, for example, and a metal layer having low specific resistivity, such as an Al-based metal or an Ag-based metal, for example. After forming the first conductive layer on a surface of the substrate, a photoresist layer is formed thereon and a lithography process is performed using a mask to form a photoresist mask pattern. An etch process is performed using the photoresist mask pattern as an etch mask. As a result, the first gate line 100-Ga and the second gate line 100-Gb and the gate terminals 611 and 621, respectively, are formed, as illustrated in FIGS. 5 and 8. The first charge control line 300-Ca and the second charge control line 300-Cb are formed, and the gate terminal 711 of the charge control transistor 701 (FIG. 3) is formed on the first charge control line 300-Ca and the second charge control line 300-Cb.

Referring now to FIGS. 6 and 9, gate insulating layers 612 and 622, a thin film for an active layer and a thin film for an ohmic contact layer are sequentially formed on the substrate 10 where the first gate line 100-Ga and the second gate line 100-Gb are formed. Then, the thin film for the active layer and the thin film for the ohmic contact layer are patterned to form active layers 613, 623 and 713, and ohmic contact layers 614 and 624.

In an exemplary embodiment of the present invention, the gate insulating layers 612 and 622 may include an inorganic insulating material such as silicon oxide or silicon nitride, for example. An amorphous silicon layer is used as the thin film for the active layer. A silicide or, alternatively, an amorphous silicon layer heavily doped with n-type impurities, is used as the thin film for the ohmic contact layer.

Next, a second conductive layer is formed patterned to form the first data line 200-Da and the second data line 200-Db, source terminals 631, 641 and 721, drain terminals 651, 661 and 731 and the storage line 400. The second conductive layer according to an exemplary embodiment of the present invention may include a single layer or, alternatively, a multi-layer, which may be formed of one or more of Mo, Al, Cr, Ti and combinations thereof, for example. In an exemplary embodiment, the second conductive layer may be formed of substantially the same material used for the first conductive layer.

Thus, the first TFT 601 and the second TFT 602, as well as the charge control transistor 701 are fabricated, each of which includes gate terminals 611, 621 and 711, respectively, source terminals 631, 641 and 721, respectively, and drain terminals 651, 661 and 731, respectively.

Referring now to FIGS. 7 and 10, a passivation layer 530 is disposed on the substrate 10 where the first TFT 601, the second TFT 602 and the charge control transistor 701 are formed. The passivation layer 530 is partially removed by an etch process using a photoresist mask pattern, for example, to form the first pixel contact hole 652 and the second pixel contact hole 662 which expose portions of the drain terminals 651 and 661, respectively, of the first TFT 601 and the second TFT 602, respectively. In addition, a source contact hole 722 is formed to expose a portion of the source terminal 721 of the charge control transistor 701, and a drain contact hole 732 is formed to expose a portion of the drain terminal 731 of the charge control transistor 701.

A third conductive layer is then formed on the passivation layer 530 proximate to the abovementioned contact holes. The third conductive layer is patterned using a photoresist mask pattern to form the first pixel electrode 510 and the second pixel electrode 520 having the cut-out patterns formed therebetween.

In an exemplary embodiment of the present invention, the third conductive layer may include a transparent conductive layer such as ITO or IZO, for example. The first pixel electrode 510 is connected to the drain terminal 651 of the first TFT 601 through the first pixel contact hole 652. The second pixel electrode 520 is connected to the drain terminal 661 of the second TFT 602 through the second pixel contact hole 662, and is connected to the source terminal 721 of the charge control transistor 700 through the source contact hole 722. The charge control electrode 800 is connected to the drain terminal 731 of the charge control transistor 700 through the drain contact hole 732.

After forming the first pixel electrode 510 and the second pixel electrode 520, a first alignment layer (not shown) is formed thereon, thereby completing a lower substrate, e.g., the TFT substrate.

In an exemplary embodiment of the present invention, a common electrode substrate (not shown) is prepared by sequentially forming a black matrix, color filters, an overcoat layer, protrusive patterns, a transparent common electrode and a second alignment layer over a transparent insulation substrate. Thereafter, the TFT substrate and the common electrode substrate are attached to each other with a spacer (not shown) interposed therebetween. Subsequently, a liquid crystal layer is formed by injecting liquid crystal material into a space formed by the spacer between the TFT substrate and the common electrode substrate, thus completing the LCD according to an exemplary embodiment of the present invention.

Although the TFT substrate according to an exemplary embodiment of the present is formed using five sheet masks, as described herein, the masking process is not limited thereto. For example, the TFT substrate according to an alternative exemplary embodiment of the present invention may be formed using more than five sheet masks or, alternatively, less than five sheet masks.

According to exemplary embodiments of the present invention as described herein, a unit pixel has a first sub pixel and a second sub pixel, and adjusts an amount of charges in the first sub pixel and the second sub pixel. Further, an upper pixel and a lower pixel, vertically adjacent to each other, are simultaneously driven.

The present invention should not be construed as being limited to the exemplary embodiments set forth herein. Rather, these exemplary embodiments are provided so that this disclosure will be thorough and complete and will fully convey the concept of the present invention to those skilled in the art.

While the present invention has been particularly shown and described with reference to exemplary embodiments thereof, it will be understood by those of ordinary skill in the art that various changes in form and details may be made therein without departing from the spirit or scope of the present invention as defined by the following claims.

What is claimed is:
1. A display device, comprising:
a plurality of unit pixels arranged in a matrix having pixel columns and pixel rows, the plurality of unit pixels comprising:
a first unit pixel disposed in a first pixel column and a first pixel row; and
a second unit pixel disposed in the first pixel column and a second pixel row adjacent to the first pixel row;

a plurality of gate lines extending in a substantially row direction, the plurality of gate lines comprising:
a first gate line connected to the first unit pixel; and
a second gate line connected to the second unit pixel;
a plurality of data lines extending in a substantially column direction, the plurality of data lines comprising:
a first data line connected to the first unit pixel; and
a second data line connected to the second unit pixel; and
a plurality of charge control lines extending in a substantially row direction, the plurality of charge control lines comprising:
a first charge control line electrically connected to the first unit pixel; and
a second charge control line electrically connected to the second unit pixel,
wherein
the first gate line connected to the first unit pixel in the first pixel row and the second gate line connected to the second unit pixel in the second pixel row adjacent to the first pixel row simultaneously receive a same gate pulse, and
the first charge control line connected to the first unit pixel in the first pixel row and the second charge control line connected to the second unit pixel in the second pixel row adjacent to the first pixel row simultaneously receive a same charge control gate turn-on voltage after the first gate line and the second gate line simultaneously receive a gate turn-on voltage.

2. The display device of claim 1, wherein
the first unit pixel is connected to the first data line, and
the second unit pixel is connected to the second data line.

3. The display device of claim 2, wherein
the first unit pixel comprises a first sub pixel and a second sub pixel,
the first gate line is electrically connected to the first sub pixel and the second sub pixel; and
the first charge control line is electrically connected to at least one of the first sub pixel and the second sub pixel.

4. The display device of claim 3, wherein the first sub pixel comprises:
a first pixel electrode; and
a first thin film transistor applying a signal of the first data line to the first pixel electrode based on a gate turn-on voltage supplied to the first thin film transistor by the gate line.

5. The display device of claim 4, wherein the second sub pixel comprises:
a second pixel electrode;
a second thin film transistor configured to apply the signal of the first data line to the second pixel electrode based on the gate turn-on voltage supplied to the second thin film transistor by the first gate line;
a charge control electrode; and
a charge control transistor configured to electrically connect the second pixel electrode to the charge control electrode based on a charge control gate turn-on voltage of the first charge control line.

6. The display device of claim 5, wherein
the charge control transistor is electrically connected to a charge down capacitor, a first electrode of which comprises the charge control electrode, and
the first sub pixel and the second sub pixel are charged with different voltages based on an operation of the charge down capacitor.

7. The display device of claim 6, wherein
the first unit pixel comprises a storage line extending in substantially the column direction, and
the storage line comprises a protruding portion which overlaps at least a portion of the charge control electrode.

8. The display device of claim 5, wherein the first gate line is disposed on the first unit pixel.

9. The display device of claim 8, wherein
a first area of the first gate line overlaps a portion of the first pixel electrode,
a second area of the second gate line overlaps a portion of the second pixel electrode, and
a size of the first area is equal to a size of the second area.

10. The display device of claim 3, wherein
the first sub pixel and the second sub pixel each comprise a plurality of domain regions, and
orientations of liquid crystals in domain regions of the plurality of domain regions are different.

11. The display device of claim 1,
wherein the first unit pixel comprises a thin film transistor comprising:
a gate electrode;
a gate insulation layer and an active layer disposed on the gate electrode; and
one of a source electrode and a drain electrode disposed on the active layer,
the active layer is disposed under the first data line, and
a shape of the active layer is substantially the same as a shape of the first data line.

12. A method of driving a display device comprising a plurality of unit pixels arranged in a matrix having pixel columns and pixel rows, the plurality of unit pixels comprising a first unit pixel disposed in a first pixel column and a first pixel row, and a second unit pixel disposed in the first pixel column and a second pixel row adjacent to the first pixel row, the display device further comprising a plurality of gate lines extending in a substantially row direction, the plurality of gate lines connected to the first unit pixel, and a second gate line connected to the second unit pixel, a plurality of data lines extending in a substantially column direction, the plurality of data lines comprising a first data line connected to the first unit pixel, and a second data line connected to the second unit pixel, and a plurality of charge control lines extending in a substantially row direction, the plurality of charge control lines comprising a first charge control line electrically connected to the first unit pixel and a second charge control line electrically connected to the second unit pixel, the method comprising:
simultaneously applying a gate turn-on voltage to the first gate line connected to the first unit pixel in the first pixel row and the second gate line connected to the second unit pixel in the second pixel row adjacent to the first pixel row;
charging the first unit pixel with a gray voltage supplied by the first data line;
applying a gate turn-off voltage to the first gate line and the second gate line; and
simultaneously applying a charge control gate turn-on voltage to the first charge control line connected to the first unit pixel in the first pixel row and the second charge control line connected to the second unit pixel in the second pixel row adjacent to the first pixel row for changing a value of the gray voltage charged into a first sub pixel of the first unit pixel and a first sub pixel of the second unit pixel after the simultaneously applying the gate turn-on voltage to the first gate line and the second gate line.

13. The method of claim 12, wherein the applying the gate turn-off voltage to first gate line and the second gate line and the applying the charge control gate turn-on voltage to the first charge control line are performed at the same time.

14. The method of claim 12, wherein the applying the charge control gate turn-on voltage to the first change control line and the second charge control line is performed after the applying the gate turn-off voltage to the first gate line and the second gate line by a predetermined time.

15. The method of claim 12, wherein the charging the first unit pixel with the gray voltage supplied by the first data line comprises charging a same gray voltage level to the first sub pixel and a second sub pixel of the first unit pixel.

16. The method of claim 15, wherein the changing the value of the gray voltage charged into the first sub pixel comprises electrically connecting a charge down capacitor to the first sub pixel by turning on the first charge control transistor connected to the first charge control line.

\* \* \* \* \*